UNITED STATES PATENT OFFICE.

FREDERICK H. FINDON, JR., OF FREEPORT, PENNSYLVANIA.

COMPOUND FOR SMOOTHING PLATE-GLASS.

No. 876,447.  Specification of Letters Patent.  Patented Jan. 14, 1908.

Application filed February 12, 1907. Serial No. 357,088. (Specimens.)

*To all whom it may concern:*

Be it known that I, FREDERICK H. FINDON, Jr., a citizen of the United States, residing at Freeport, in the county of Armstrong and State of Pennsylvania, have invented a new and useful Compound for Smoothing Plate-Glass; of which the following is a specification.

This invention has reference to improvements in a compound for smoothing plate glass, and its object is to facilitate this part of the process of making plate glass and to produce better results than have heretofore been produced by the processes employed for the purpose.

In making plate glass the cast plates are first roughly ground by the application of sand and water through the intermediary of suitable grinding machines until the plate is reduced to approximately the desired thickness, after which the plates thus rough-ground are smoothed by the application successively of emery powder of finer and finer grades and are thereby prepared for the final operation of polishing. During the grinding operation the surface of the plate is made true but it presents a rough appearance, which is, however, removed by the process of smoothing. The smooth plate is then somewhat opaque but this entirely disappears on the final operation of polishing.

This invention has to do with that part of the process in the manufacture of plate glass which is known as the smoothing process. For this purpose I take the three finest grades of dry emery, namely, those known as Nos. 7, 8 and 9, and mix each grade with the same amount of alum water. For instance, I may take two pounds of the dried emery powder and mix it up with one pint of water in which one-half an ounce of alum has been dissolved. Taking first No. 7 emery powder mixed with one pint of water in which one-half an ounce of alum has been dissolved, I throw this with a brush on to the glass plate as the table turns around and around, and keep the glass moistened at the same time with a small spray of water. This is continued for, say, fifteen minutes. I then take two pounds of No. 8 emery mixed with one pint of water in which one-half an ounce of alum has been dissolved, and throw this on the glass with a brush, using a small spray of water to keep the glass moistened, and continue the smoothing action for about fifteen minutes. Finally, I take two pounds of No. 9 dried emery powder and mix the same with one pint of water in which one-half an ounce of alum has been dissolved, and apply this to the glass by throwing it from a brush, and also using a small spray of water to keep the glass moistened, and continue this smoothing action for about fifteen minutes. After the glass plate has been smoothed in this manner it is polished with any suitable polishing powder such as red oxid of iron in the usual manner, but this constitutes a step beyond that to which the present invention relates.

In carrying out my process the water in which the alum is dissolved may be warm and it may be used warm when the emery is mixed with it and applied to the glass. The purpose of using the small spray of water on the glass is simply to keep it moistened during the process of smoothing the glass and to keep the emery paste from getting too dry. I have found that the addition of alum to the emery powder greatly facilitates its action and produces a much better smooth finish than when emery powder alone is used.

It will be understood, of course, that I do not limit myself to the exact proportions which I have named, and I have only taken two pounds of emery powder and one-half an ounce of alum as an example of the proportions which have given good results.

The alum water may be prepared by dissolving one and one-half ounces of alum in three pints of warm water and using one pint of this solution to two pounds of each grade of emery powder.

I have found that by the addition of the alum to the emery there is produced a much finer, smoother surface than is obtained by the use of emery alone; in fact, the glass surface is much clearer than when smoothed with emery without the addition of the alum.

Without limiting myself to the theory of the operation, I may state that I conceive that the addition of the alum causes the emery to bite more readily on to the glass surface and produces in the emery a greater body, for I have found that the polishing machinery requires more force to drive it, and the emery holds its body very much better than when the alum is omitted.

I claim:—

1. The composition of matter for smoothing plate glass preparatory to polishing the same, consisting of a paste composed of emery, alum and water.

2. The composition of matter for smoothing plate glass preparatory to polishing the same, consisting of emery, alum and water in the proportions of about two pounds of emery, one-half an ounce of alum and one pint of water.

In testimony that I claim the foregoing as my own, I have hereto affixed my signature in the presence of two witnesses.

FREDERICK H. FINDON, Jr.

Witnesses:
H. W. ROWLEY,
J. E. ARNOLD.